Jan. 20, 1925.  
E. C. MORINE  
VEHICLE TOP  
Filed May 1, 1919 — 3 Sheets-Sheet 1  
1,523,704

Witness  
Inventor  
Edwin C. Morine  
By Pagelsen and Spencer  
Attorneys

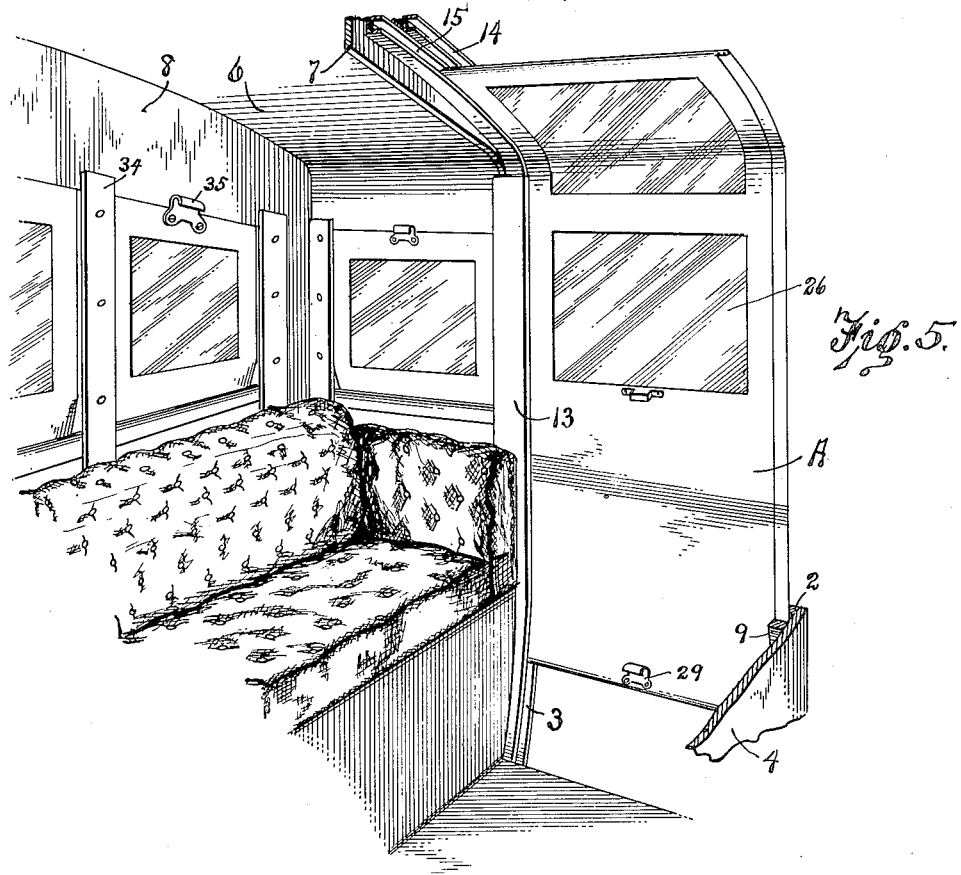
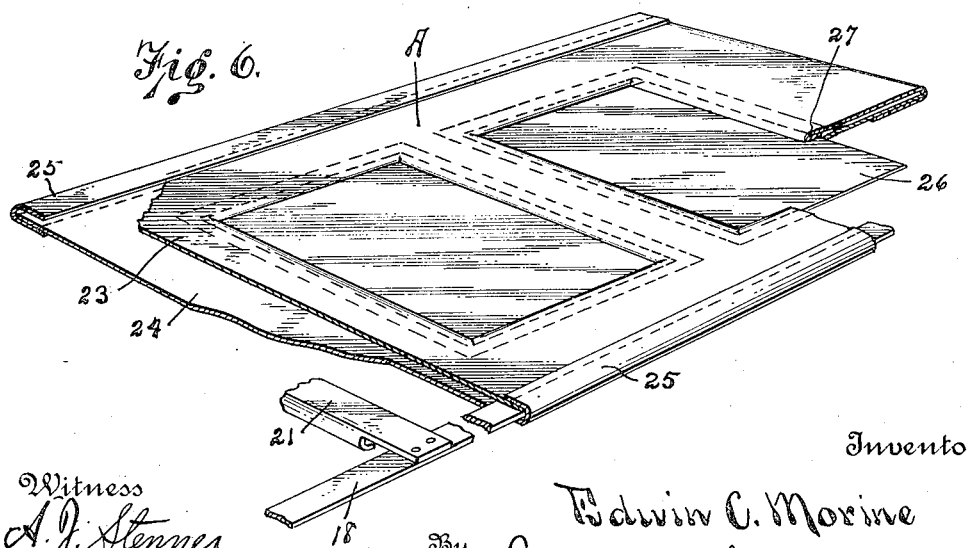

Jan. 20, 1925.
E. C. MORINE
VEHICLE TOP
Filed May 1, 1919   3 Sheets-Sheet 3
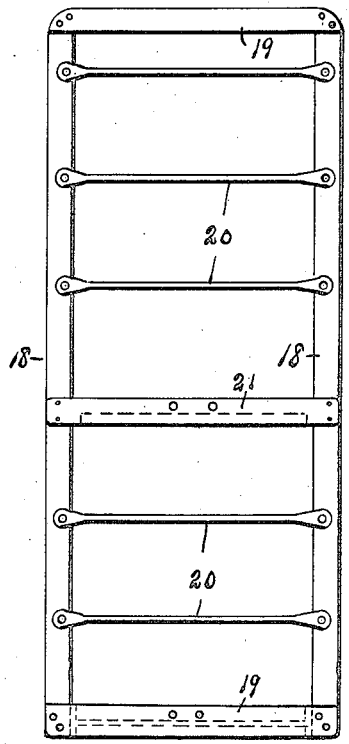
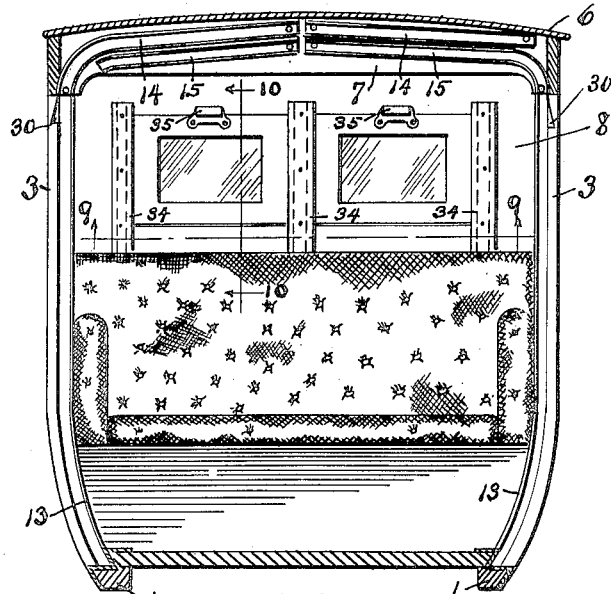
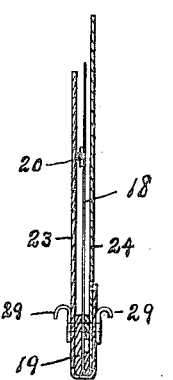
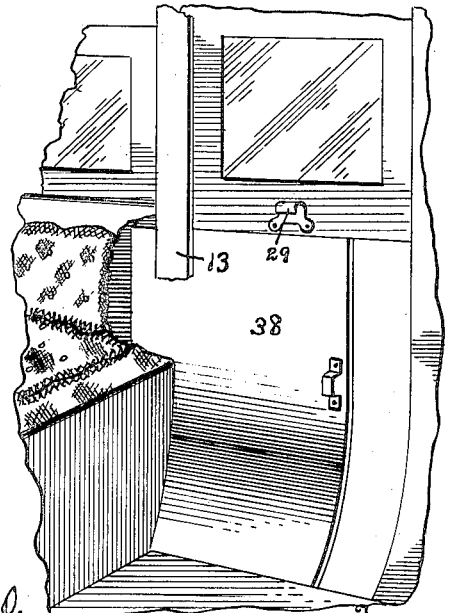

Patented Jan. 20, 1925.

1,523,704

UNITED STATES PATENT OFFICE.

EDWIN C. MORINE, OF DETROIT, MICHIGAN, ASSIGNOR TO WEATHERPROOF BODY CORPORATION, OF CORUNNA, MICHIGAN, A CORPORATION OF MICHIGAN.

VEHICLE TOP.

Application filed May 1, 1919. Serial No. 293,984.

*To all whom it may concern:*

Be it known that I, EDWIN C. MORINE, a citizen of the United States, and residing at Detroit, in the county of Wayne and State of Michigan, have invented a new and Improved Vehicle Top, of which the following is a specification.

This invention relates to the construction of flexible slidable doors and windows for the closed bodies of vehicles, but particularly for truck cabs, and its object is to provide curtain constructions which will remain flat whenever permitted, which will not rattle and which may be moved freely to any desired position.

This invention consists in a vehicle cab comprising a frame-work consisting of upright members and at least one central transverse member extending across the top of the cab just back of the door opening, and a permanent outer covering formed with door openings, and window openings, if desired, flexible resilient doors guidable to close the door openings and slidable between guides carried by said top, and formed of a flattened tube of fabric having window openings closed with a sheet of flexible material and a metal frame within the tube, which frame is built up of resilient flat side bars and rigid cross-bars united at their ends to the cross bars.

It also consists in the details of construction illustrated in the accompanying drawings and particularly pointed out in the claims.

Figure 1:
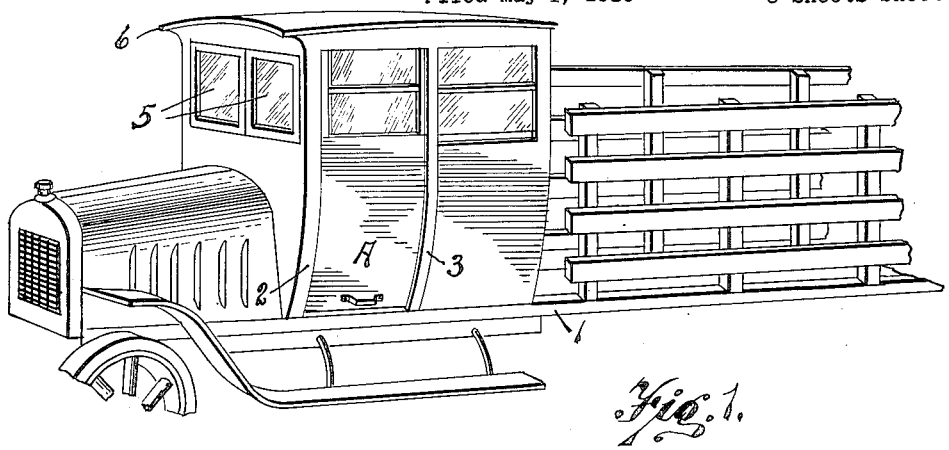
Figure 2:
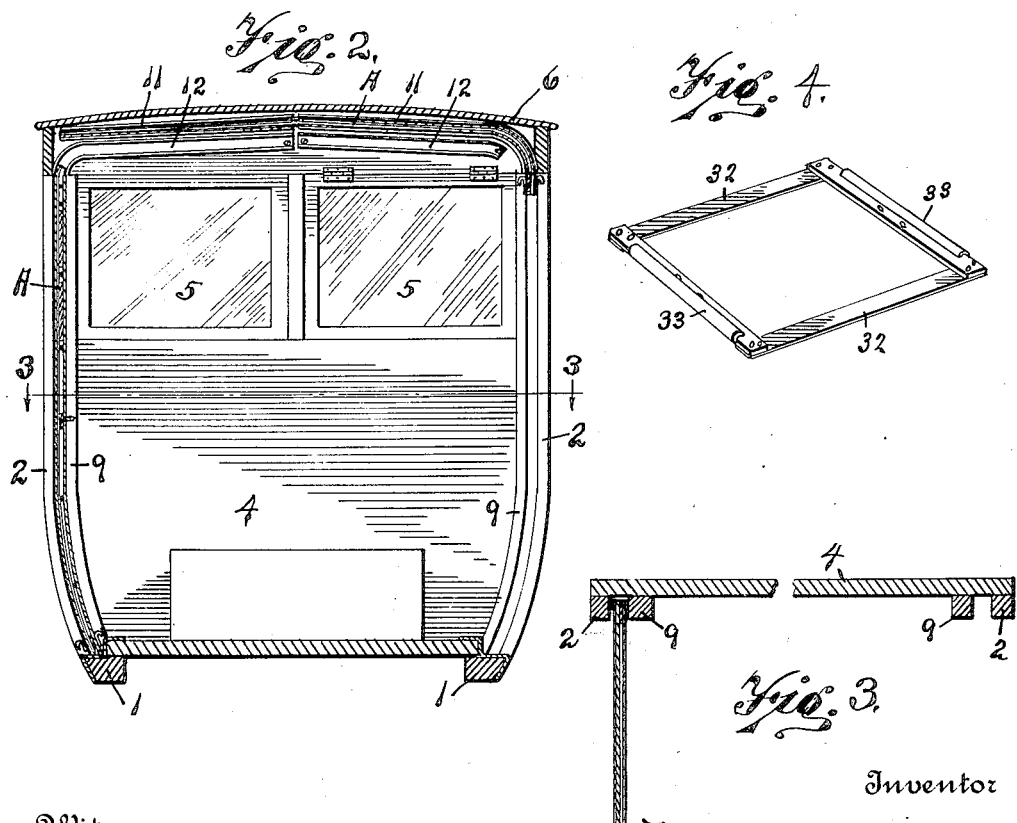
Figure 4:
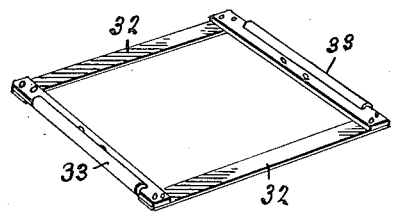
Figure 3:
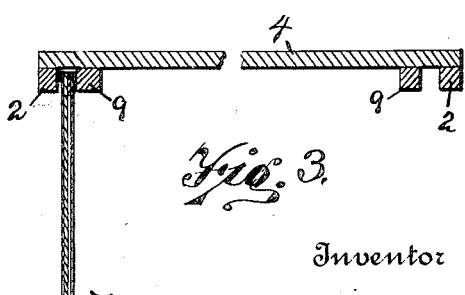

In the accompanying drawings, Fig. 1 is a perspective view of a truck frame having a cab provided with my improved doors. Fig. 2 is a vertical section of the cab through the doors and looking forward. Fig. 3 is a section on the line 3—3 of Fig. 2. Fig. 4 is a perspective view of a window frame. Fig. 5 is an interior perspective view of a cab provided with my improved door. Fig. 6 is a perspective view illustrating the construction of a door. Fig. 7 is an elevation of the frame-work for a door curtain. Fig. 8 is a vertical section on the same plane as Fig. 2 but looking back. Figs. 9 and 10 are sections on the lines 9—9 and 10—10 of Fig. 8, respectively. Fig. 11 is a central vertical section of the bottom of a door. Fig. 12 is a perspective showing a vertically slidable curtain and a horizontally slidable door.

Similar reference characters refer to like parts throughout the several views.

Truck cabs are usually unprovided with doors as there is no room to permit them to swing inwardly and doors that swing outwardly are often prevented from opening by the sides of the building along side which the truck is standing while being loaded. Loose curtains slidable on horizontal wires are usually all the protection given the driver against the weather. In the truck cabs shown in the drawings the doors slide up and down in proper grooves formed in opposed sides of door frames which support the top, guides being properly mounted in the top itself to support the slidable flexible doors which may be pulled down until their lower ends engage the floor of the cab, or, as shown in Fig. 2, extend below the floor and so prevent rain blowing up into the cab.

The cab is shown built up on side sills 1 upon which the upright members 2 and 3 are mounted. A front 4 is secured to the upright members 2 and may have windows 5, hinged to the front 4 as shown in Fig. 2 if desired. A top 6 of any desired material extends back from the top of the front 4, over the crossbar 7 which extends across between the uprights 3 and to the top of the back 8 of the cab.

Strips 9 may be secured to the front 8, and, together with the upright members 2 form upright guides for the doors. Other guides 11 and 12, which are substantially horizontal, connect to the vertical guides and are secured to the front 4 to receive the edges of the doors when pushed up. Figs. 5 and 8 show strips 13 secured to the inner edges of the members 3, and guides 14 and 15 secured to the cross bar 7. The flexible doors A that are slidable in the grooves thus formed are preferably constructed as follows.

A frame for the door is made up of flat and quite thin resilient metal strips 18 secured together by cross bars 19, 20, and 21. A flat tube is sewed up, as shown in Fig. 6, of the front 23, back 24 and edge selvage strips 25. After the frame has been slipped into the tube, the front is folded over and secured to the back at both top and bottom. Openings are then cut for the windows and the celluloid sheets 26 are inserted and the front and back are stitched together just outside the edges of the sheets. The cloth of the front and back is then cut out to form the window openings and the inner edges of these openings are turned under, as shown at 27 in Fig. 6, after which lines of stitches are taken through the two thicknesses at each side of the celluloid and through the celluloid.

The intermediate cross bars 21 may be formed of sheet metal and have one or both edges curled, as shown in Fig. 6, for the purpose of stiffening the door laterally. Any desired number of these cross bars may be employed. Handles 29 are preferably secured to both sides of the doors at their lower ends.

The uprights 3 may be formed with notches 30, as shown in Fig. 8, to receive the rear lower corners of the doors when they are pushed up, these corners being pushed out into these notches by the resilient side bars 18 of the frames.

The window structures for the sides and back of the cab may be formed in the same manner as the doors, the side members 32 being resilient and the transverse members 33 more rigid. See Fig. 4. Guides 34 (Figs. 8, 9 and 10) may be secured to the back or sides of the cab and handles 35 to the windows so that they may be slid up and down. The bottoms of the window openings may be provided with a metal lip 36, and the bottom of the window may be bent out to extend down over this lip, the side 37 of the casing being cut away to permit such distortion of the window.

In some cases it may be desirable to have a longitudinally slidable door 38 of rigid material, such as sheet steel, at the bottom of the door opening, as shown in Fig. 12, and a slot will then be left for such door in the frame piece 3. Laminated wood is also a very desirable material for such doors.

The reason for the lip 36 will be most apparent to those who have been soaked by rain driving through under ordinary slidable windows of vehicle tops. But by forming the side members of the frame of the window of resilient metal so as to permit the lower edge of the window to extend down over the lip 36, and to hold the edge of the window tightly against this lip, the entrance of rain is prevented.

The details, proportions and sizes of the various parts may all be changed by those skilled in this art without departing from the spirit of my invention as set forth in the following claims.

I claim:—

1. A flexible resilient door consisting of a frame, a fabric covering therefor and celluloid windows, the frame comprising thin resilient and flexible side strips and rigid cross bars connecting thereto, the fabric covering consisting of two sides and a selvage strip extending around and uniting their longitudinal edges, said sides being formed with registering window openings, and sheets of celluloid in said window openings with their edges between the two sides of fabric.

2. A vehicle top comprising a framework and an outer permanent covering formed with a door opening the framework at said door opening constituting vertical guides, transverse guides above the door opening attached to the top and connecting with the guides in the door frames, and a flexible resilient door mounted in said guides and of greater length than the height of said door opening, one of the sides of the door frame being provided with a projection or shoulder at the upper end of said opening and at one side of the normal path of the door to arrest a lower corner of the door frame when the door has been moved past such projection.

3. A vehicle top comprising a framework and an outer permanent covering formed with openings, said framework at the bottom of one of the openings having an upwardly extending lip and notches at the lower ends of the sides of the said opening, and a flexible resilient closure slidable across the opening and having a resilient lower edge adapted to be bent outward and to be slid down over said lip.

EDWIN C. MORINE.